United States Patent
Qin et al.

(10) Patent No.: US 11,507,894 B2
(45) Date of Patent: Nov. 22, 2022

(54) SYSTEM AND METHOD FOR RIDE ORDER DISPATCHING

(71) Applicant: Beijing DiDi Infinity Technology and Development Co., Ltd., Beijing (CN)

(72) Inventors: Zhiwei Qin, San Jose, CA (US); Xiaocheng Tang, San Mateo, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 348 days.

(21) Appl. No.: 16/639,889

(22) PCT Filed: Sep. 5, 2018

(86) PCT No.: PCT/US2018/049493
§ 371 (c)(1),
(2) Date: Feb. 18, 2020

(87) PCT Pub. No.: WO2019/050908
PCT Pub. Date: Mar. 14, 2019

(65) Prior Publication Data
US 2020/0364627 A1 Nov. 19, 2020

Related U.S. Application Data

(60) Provisional application No. 62/555,879, filed on Sep. 8, 2017.

(51) Int. Cl.
*G06Q 10/02* (2012.01)
*G06N 3/04* (2006.01)
(Continued)

(52) U.S. Cl.
CPC ........... *G06Q 10/02* (2013.01); *G06N 3/0454* (2013.01); *G06N 3/084* (2013.01);
(Continued)

(58) Field of Classification Search
CPC ............... G06Q 10/02; G06Q 10/0833; G06Q 10/0836; G06Q 50/30; G06N 3/0454; G06N 3/084
(Continued)

(56) References Cited

U.S. PATENT DOCUMENTS 10,732,639 B2 * 8/2020 Palanisamy .......... G05D 1/0088
2004/0024621 A1   2/2004 Read
(Continued)

FOREIGN PATENT DOCUMENTS

WO    WO-2018172849 A1 *  9/2018  ........ B60W 60/0011

OTHER PUBLICATIONS

Finnman, Peter and Max Winberg. "Deep reinforcement learning compared with Q-table learning applied to backgammon." https://www.kth.se/social/files/58865ec8f27654607fb6e9a4/PFinnman_MWinberg_dkand16.pdf (Year: 2016).*
(Continued)

*Primary Examiner* — Shannon S Campbell
*Assistant Examiner* — Lisa Ma
(74) *Attorney, Agent, or Firm* — Sheppard Mullin Richter & Hampton LLP

(57) ABSTRACT

A ride order dispatching system comprises a processor, and a non-transitory computer-readable storage medium storing instructions that, when executed by the processor, cause the processor to perform a method. The method comprises: obtaining, from a computing device, a current location of a vehicle; inputting the current location of the vehicle and a time to a trained neural network model to obtain action information for the vehicle, the action information comprising: staying at the current location of the vehicle, repositioning the vehicle, or accepting a ride order; and transmitting the action information to the computing device to cause the vehicle to stay at the current location, re-
(Continued)

position to another location, or accept the ride order by proceeding to a pick-up location of the ride order.

14 Claims, 16 Drawing Sheets

(51) Int. Cl.
    *G06N 3/08* (2006.01)
    *G06Q 10/08* (2012.01)
    *G06Q 50/30* (2012.01)
(52) U.S. Cl.
    CPC ..... *G06Q 10/0833* (2013.01); *G06Q 10/0836* (2013.01); *G06Q 50/30* (2013.01)
(58) Field of Classification Search
    USPC .......................................................... 705/5
    See application file for complete search history.

(56) References Cited

U.S. PATENT DOCUMENTS

| | | | |
|---|---|---|---|
| 2009/0327011 A1* | 12/2009 | Petroff | G06Q 50/30 705/5 |
| 2013/0159206 A1* | 6/2013 | Barahona | G06Q 50/28 705/338 |
| 2015/0204684 A1 | 7/2015 | Rostamian et al. | |
| 2017/0123423 A1 | 5/2017 | Sako et al. | |
| 2017/0132334 A1 | 5/2017 | Levinson et al. | |
| 2017/0132540 A1* | 5/2017 | Haparnas | G06Q 10/1093 |
| 2017/0193360 A1* | 7/2017 | Gao | G06N 3/0445 |
| 2018/0341881 A1* | 11/2018 | Kislovskiy | G06Q 10/0832 |
| 2019/0220737 A1* | 7/2019 | Yao | G06N 3/0481 |

OTHER PUBLICATIONS

Hasselt, H., Guez, A., & Silver, D. Deep Reinforcement Learning with Double Q-Learning. Proceedings of the AAAI Conference on Artificial Intelligence, 30(1). https://ojs.aaai.org/index.php/AAAI/article/view/10295 (Year: 2016).*
Liu, Yang; Wu, Fanyou; Lyu, Cheng; Li, Shen; Ye, Jieping; Qu, Xiaobo. "Deep dispatching: A deep reinforcement learning approach for vehicle dispatching on online ride-hailing platform". https://www.sciencedirect.com/science/article/pii/S1366554522000862?via%3Dihub (Year: 2022).*
L. Moreira-Matias et al., "On predicting the taxi-passenger demand: A real-time approach," in Portuguese Conference an Artificial Intelligence. Springer, 2013, pp. 54-65.
L. Moreira-Matias et al., "Predicting taxi-passenger demand using streaming data," IEEE Transactions on Intelligent Transportation Systems, vol. 14, No. 3, pp. 1393-1402, 2013.
Q. Li et al., "Hierarchical route planning based on taxi GPS-trajectories," in Geoinformatics, 2009 17th International Conference on. IEEE, 2009, pp. 1-5.
T. Xin-min et al., "Aircraft taxi route planning for a-smgcs based on discrete event dynamic system modeling," in Computer Modeling and Simulation, 2010. ICCMS'10. Second International Conference on, vol. 1. IEEE, 2010, pp. 224 228.
J. Lee et al., "A telematics service system based on the linux cluster," in International Conference on Computational Science. Springer, 2007, pp. 660-667.
A. Glaschenko et al., "Multi-agent real time scheduling system for taxi companies," in 8th International Conference on Autonomous Agents and Multiagent Systems (AAMAS 2009), Budapest, Hungary, 2009, pp. 29-36.
D.-H. Lee et al., "Taxi dispatch system based on current demands and real-time traffic conditions," Transportation Research Record: Journal of the Transportation Research Board, No. 1882, pp. 193-200, 2004.
L. Zhang et al., "A taxi order dispatch model based on combinatorial optimization," in Proceedings of the 23rd ACM SIGKDD International Conference on Knowledge Discovery and Data Mining. ACM, 2017, pp. 2151-2159.
C. H. Papadimitriou et al., Combinatorial optimization: algorithms and complexity. Courier Corporation, 1998.
T. Verma et al., "Augmenting decisions of taxi drivers through reinforcement learning for improving revenues," in International Conference on Automated Planning and Scheduling, 2017, pp. 409-417.
Z. Xu et al., "Large-scale order dispatch in on-demand ride-sharing platforms: a learning and planning approach," in Proceedings of the 24rd ACM SIGKDD International Conference on Knowledge Discovery and Data Mining. ACM, 2018.
C. J. C. H. Watkins et al., "Q-learning," Machine Learning, vol. 8, No. 3-4, pp. 279-292, May 1992.
V. Mnih et al., "Human-level control through deep reinforcement learning," Nature, vol. 518, No. 7540, pp. 529-533, 2015.
M. E. Taylor et al., "Transfer learning for reinforcement learning domains: A survey," Journal of Machine Learning Research, vol. 10, No. Jul, pp. 1633-1685, 2009.
S. J. Pan and Q. Yang, "A survey on transfer learning," IEEE Transactions on knowledge and data engineering, vol. 22, No. 10, pp. 1345-1359, 2010.
J. Kirkpatrick et al., "Overcoming catastrophic forgetting in neural networks," Proceedings of the National Academy of Sciences, vol. 114, No. 13, pp. 3521-3526, 2017.
Y. Teh et al., "Distral: Robust multitask reinforcement learning," in Advances in Neural Information Processing Systems, 2017, pp. 4499-4509.
A. A. Rusu et al., "Progressive neural networks," arXiv preprint arXiv:1606.04671, 2016.
E. Parisotto et al., "Actor-mimic: Deep multitask and transfer reinforcement learning," arXiv preprint arXiv:1511.06342, 2015.
I. Higgins et al., "Darla: Improving zero-shot transfer in reinforcement learning," arXiv preprint arXiv:1707.08475, 2017.
A. Maurer et al., "The benefit of multitask representation learning," The Journal of Machine Learning Research, vol. 17 No. 1, pp. 2853-2884, 2016.
Z. Luo et al., "Label efficient learning of transferable representations acrosss domains and tasks," in Advances in Neural Information Processing Systems, 2017, pp. 164-176.
Z. Wang et al., "Improving Reinforcement Learning with Confidence-Based Demonstrations," in Proceedings of the 26th International Conference on Artificial Intelligence (IJCAI), Aug. 2017.
H. Van Hasselt et al., "Deep reinforcement learning with double q-learning." in AAAI, 2016, pp. 2094-2100.
G. E. Hinton et al., "Reducing the dimensionality of data with neural networks," science, vol. 313, No. 5786, pp. 504-507, 2006.
R. S. Sutton et al., Reinforcement Learning: An Introduction, Cambridge: MIT press, vol. 1, No. 1, 1998.
PCT International Search Report and the Written Opinion dated Nov. 28, 2018, issued in International Application No. PCT/US2018/049493 (8 pages).
Peter Finnman et al., "Deep reinforcement learning compared with Q-table learning applied to backgammon", Degree Project in Technology, First Cycle, Stockholm, Sweden 2016, [online] [retrieved on Nov. 8, 2018 (Nov. 8, 2018)] Retrieved from the Internet <URL: https://www.kth.se/social/files/58865ec8f27654607fb6e9a4/PFinnman_MWinberg_dkand16.pdf.

* cited by examiner

Algorithm 1 Double-DQN with spatio-temporal action search

1: Given: historical trips pool $\mathcal{P}$, a constant $C$.
2: Initialize replay memory $\mathcal{M}$ to capacity $N$ and insert the terminal transitions set $\{x :  x_{s_1}$ is terminal$\}$.
3: Initialize the state-action value network $Q$ with random weights $\theta_0$.
4: Initialize the target state-action value network $\hat{Q}$ with weights $\theta_0$.
5: for $t = 1, 2, \ldots, T$ do
6:    Remove a trip sample $(s_0, r, s_1)$ from $\mathcal{P}$, where $s_0 = (l_0, t_0), s_1 = (l_1, t_1)$.
7:    Extract action $a$ from $s_1$. Store transition $(s_0, a, r, s_1)$ in $\mathcal{M}$.
8:    Sample a random mini-batch $\{(s_j, a_j, r_j, s_{j+1})\}$ from $\mathcal{M}$.
9:    For each $s_{j+1}$, perform action search in Algorithm 2 and get $\hat{\mathcal{A}}$.
10:    if $s_{j+1}$ is a terminal state then
11:       $y_j \leftarrow r_j$
12:    else
13:       $y_j \leftarrow r_j + \gamma \hat{Q}(s_{j+1}, \arg\max_{a' \in \hat{\mathcal{A}}} Q(s_{j+1}, a' | \theta_{t-1}) | \hat{\theta}_{t-1})$
14:    end if
15:    Perform a gradient descent step on $\theta$ per loss function $(y_j - Q(s_j, a_j | \theta))^2$ and get $\theta_t$.
16:    if $t \bmod C = 0$ then
17:       $\hat{\theta}_t \leftarrow \theta_t$
18:    end if
19:    Perform experience augmentation described in Specification
20: end for
21: return $Q$

FIG. 3D

Algorithm 2 Spatio-temporal action search

1: Given $s = (l_0, t_0)$; $t'$ is search time limit.
2: $\mathcal{A} \leftarrow \{\}$
3: $T_{\max} \leftarrow \min(T, t_0 + t')$
4: if $\tilde{\mathcal{A}}(s) \neq \emptyset$ then
5:     $\mathcal{A} \leftarrow \mathcal{A} + \tilde{\mathcal{A}}(s)$
6: else
7:     for $t = t_0, t_0 + 1, \cdots, T_{\max}$ do
8:         $s' \leftarrow (l_0, t)$
9:         if $\tilde{\mathcal{A}}(s') \neq \emptyset$ then
10:             $\mathcal{A} \leftarrow \mathcal{A} + \tilde{\mathcal{A}}(s')$
11:             break
12:         end if
13:     end for
14:     if $\mathcal{A}$ did not change from line 6 then
15:         $\mathcal{A} \leftarrow \mathcal{A} + s'$
16:     end if
17:     for $L = 1, \cdots, L_{\max}$ do
18:         if $B'(s, L) \neq \emptyset$ then
19:             $\mathcal{A} \leftarrow \mathcal{A} + \tilde{\mathcal{A}}'(s, L)$
20:             break
21:         end if
22:     end for
23:     if $\mathcal{A}$ did not change from line 17 then
24:         $\mathcal{A} \leftarrow \mathcal{A} + B'(s, L_{\max})$
25:     end if
26: end if
27: return $\mathcal{A}$

FIG. 3E

State-values by location at 4am of weekday (city A)

State-values by location at 4am of weekday (city B)

State-values by location at 8am of weekday (city A)

State-values by location at 8am of weekday (city B)

State-values by location at 2pm of weekday (city A)

State-values by location at 2pm of weekday (city B)

State-values by location at 8pm of weekday (city A)

State-values by location at 8pm of weekday (city B)

400

402: Inputting information on a location of a vehicle and a time to a trained neural network model 404: Based on a policy generated from the trained neural network model, obtaining action information for the vehicle, the action information comprising: staying at a current position of the vehicle, re-positioning the vehicle, or accepting a ride order

450

452: Obtaining, from a computing device, a current location of a vehicle, the computing device being one of the user terminals

454: Inputting the current location of the vehicle and a time to a trained neural network model to obtain action information for the vehicle, the action information comprising: staying at the current location of the vehicle, re-positioning the vehicle, or accepting a ride order

456: Transmitting the action information to the computing device to cause the vehicle to stay at the current location, re-position to another location, or accept the ride order by proceeding to a pick-up location of the ride order

FIG. 4B

SYSTEM AND METHOD FOR RIDE ORDER DISPATCHING

CROSS REFERENCE TO RELATED APPLICATIONS

This application is a national phase application of International Patent Application No. PCT/US2018/049493, filed Sep. 5, 2018, which claims priority to U.S. Provisional Patent Application No. 62/555,879, filed Sep. 8, 2017 and titled "SYSTEM AND METHOD FOR RIDE ORDER DISPATCHING,". The above-referenced applications are incorporated herein by reference in their entireties.

FIELD OF THE INVENTION

This disclosure generally relates to methods and devices for ride order dispatching.

BACKGROUND

A vehicle dispatch platform can automatically allocate transportation requests to corresponding vehicles for providing transportation services. Each vehicle driver provides and is rewarded for the transportation service. However, it has been challenging to determine an efficient allocation method that can maximize the gain for each vehicle driver.

SUMMARY

Various embodiments of the present disclosure include systems, methods, and non-transitory computer readable media for ride order dispatching.

According to one aspect, a ride order dispatching system comprises a processor, and a non-transitory computer-readable storage medium storing instructions that, when executed by the processor, cause the processor to perform a method. The method comprises: obtaining, from a computing device, a current location of a vehicle; inputting the current location of the vehicle and a time to a trained neural network model to obtain action information for the vehicle, the action information comprising: staying at the current location of the vehicle, re-positioning the vehicle, or accepting a ride order; and transmitting the action information to the computing device to cause the vehicle to stay at the current location, re-position to another location, or accept the ride order by proceeding to a pick-up location of the ride order.

In some embodiments, the neural network model comprises a deep neural network and a reinforcement learning algorithm, and the deep neural network comprises two deep-Q networks.

In some embodiments, the neural network model comprises: an input layer comprising one or more action inputs and one or more state inputs, one or more hidden layers, and an output layer comprising a state-action value output. The action comprises a destination and a drop-off time associated with performing a vehicle trip. The state comprises geo-coordinates of the vehicle and a pick-up time associated with the vehicle trip. The state-action value comprises a cumulative reward. The input layers, the hidden layers, and the output layer are in a sequence and every two neighbor layers are associated with one or more weights.

In some embodiments, the neural network model is trained by: modeling the vehicle trips by passing the action inputs and state inputs through the hidden layers to obtain the output, each vehicle trip associated with a first state corresponding to an origin, a second state corresponding to a destination, an action corresponding to fulfilling a ride order from the origin to the destination, and a reward corresponding to fees for the ride; and updating the weights to maximize the cumulative reward.

In some embodiments, modeling the vehicle trips comprises: modeling a first vehicle trip to obtain the second state associated with the first vehicle trip, and searching from a spatio-temporal space to obtain an action to perform at the second state, the spatio-temporal space is within a spatial threshold from the second state.

In some embodiments, modeling the vehicle trips comprises: modeling a first vehicle trip to obtain the second state associated with the first vehicle trip, and searching from a spatio-temporal space to obtain an action to perform at the second state, the spatio-temporal space is within a temporal threshold from the second state.

In some embodiments, data used for training the neural network model comprises (1) a plurality of the vehicle trips each associated with a measurement period, and (2) one or more terminal states each associated with an end of the measurement period.

According to another aspect, a computer-implemented method for ride order dispatching comprises: obtaining, from a computing device, a current location of a vehicle; inputting the current location of the vehicle and a time to a trained neural network model to obtain action information for the vehicle, the action information comprising: staying at the current location of the vehicle, re-positioning the vehicle, or accepting a ride order; and transmitting the action information to the computing device to cause the vehicle to stay at the current location, re-position to another location, or accept the ride order by proceeding to a pick-up location of the ride order.

According to another aspect, a non-transitory computer-readable storage medium stores instructions that, when executed by a processor, cause the processor to perform a ride order dispatching method. The method comprises: obtaining, from a computing device, a current location of a vehicle; inputting the current location of the vehicle and a time to a trained neural network model to obtain action information for the vehicle, the action information comprising: staying at the current location of the vehicle, re-positioning the vehicle, or accepting a ride order; and transmitting the action information to the computing device to cause the vehicle to stay at the current location, re-position to another location, or accept the ride order by proceeding to a pick-up location of the ride order.

According to another aspect, a method for ride order dispatching may comprise inputting information on a location of a vehicle and a time to a trained neural network model; and based on a policy generated from the trained neural network model, obtaining action information for the vehicle, the action information comprising: staying at a current position of the vehicle, re-positioning the vehicle, or accepting a ride order. In some embodiments, a non-transitory computer readable media may couple to a processor and comprise instructions that, when executed by the processor, cause the processor to preform various method described herein. The instructions may comprise the trained neural network model and the policy (e.g., the trained neural network model and the policy may be associated with memory locations in the media).

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 3D illustrates an exemplary algorithm for ride order dispatching, in accordance with various embodiments.

FIG. 3E illustrates another exemplary algorithm for ride order dispatching, in accordance with various embodiments.

FIG. 4B illustrates a flowchart of an exemplary method for ride order dispatching, in accordance with various embodiments.

DETAILED DESCRIPTION

Figure 1:
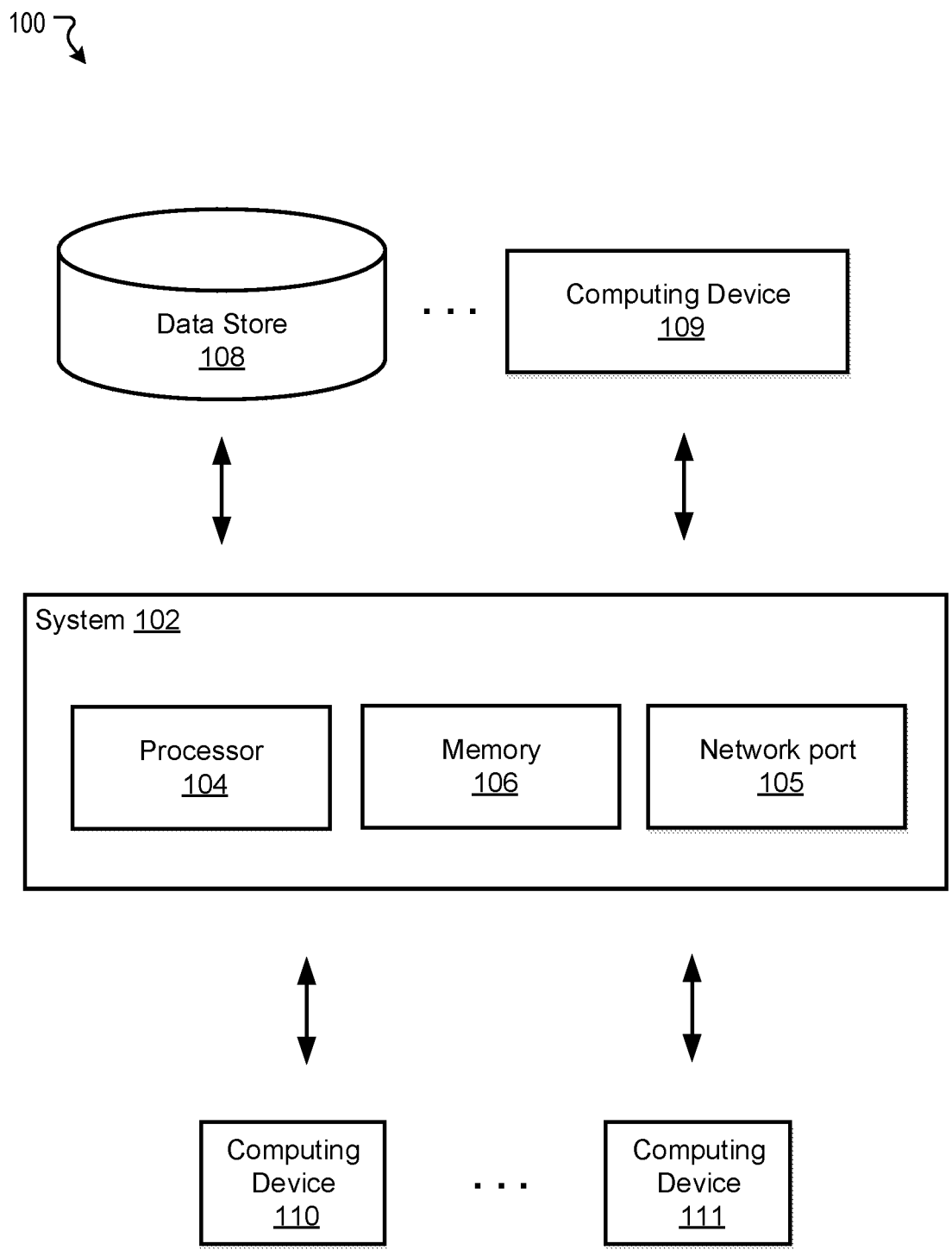
FIG. 1 illustrates an exemplary system for ride order dispatching, in accordance with various embodiments.

Vehicle platforms may be provided for transportation services. Such vehicle platform may also be referred to as a vehicle hailing or vehicle dispatching platform, accessible through devices such as mobile phones installed with a platform application. Via the application, users (ride requestors) can transmit transportation requests (e.g., a pick-up location, a destination, a current location of the user) to the vehicle platform. The vehicle platform may relay the requests to vehicle drivers based on various factors (e.g., proximity to the location of the requestor or the pick-up location). The vehicle drivers can choose from the requests, and each can pick one to accept, fulfill the request, and be rewarded accordingly. After each trip, the vehicle driver may search for more requests or receive more requests from a push-based dispatching platform, and the results may vary depending on the demand for the vehicle service. For example, the results may return many requests if the vehicle is at a night life locale on a weekend night, or may return no request if the vehicle is at a far-flung area on a weekday evening.

Current transportation-providing drivers rely on experiences or make random decisions as whether to wait for a passenger, reposition to another location, or pick up an order. Often the driver may just accept any first available order without considering its impact to the overall income within that day. To provide a technical solution that at least mitigates the deficiencies of current practices, ride order systems and methods are disclosed. In addition to merely providing drivers with available ride orders, the vehicle platform may automatically determine reward-maximizing strategies to provide to the drivers, for example suggesting the driver to wait, re-position, or accept a trip.

The disclosed systems and methods may train a machine learning model based on historical data such as various trips and rewards with respect to time and location, to obtain an optimal policy that surpasses the decision making policy reflected in the historical data in terms of reward maximization. Based on the machine-generated policy and ride orders dispatched accordingly, the disclosed systems and methods can help the vehicle drivers to obtain more earnings each day than simply relying on personal experiences, thus improving their efficiency of work.

The machine learning model used by the disclosed systems and methods may comprise a combination of modified neural network (e.g., deep neural network (DNN)) and reinforcement learning (RL) algorithm. In a regular DNN, the correct inputs and outputs need to be presented, and sub-optimal actions need to be corrected. However, in situations such as ride order dispatching, the correct inputs and outputs (e.g., correct dispatching actions at all locations) may be too complex, and all possible states and actions (e.g., vehicle locations and ride order dispatching) may be too numerous to gather. In some embodiments, as described in more details below, the combination with RL algorithm obviates the requirements for correct inputs and outputs and sub-optimal action corrections, thus harnessing the power of DNN in a scalable fashion.

Various embodiments of the present disclosure include systems, methods, and non-transitory computer readable media for determining and dispatching ride order or otherwise provide a sequence of decisions that can maximize the total revenue of a vehicle driver for a given time period (e.g., one day). In some embodiments, a ride order dispatching system comprises a processor, and a non-transitory computer-readable storage medium storing instructions that, when executed by the processor, cause the processor to perform a method. The method comprises: obtaining, from a computing device, a current location of a vehicle; inputting the current location of the vehicle and a time to a trained neural network model to obtain action information for the vehicle, the action information comprising: staying at the current location of the vehicle, re-positioning the vehicle, or accepting a ride order; and transmitting the action information to the computing device to cause the vehicle to stay at the current location, re-position to another location, or accept the ride order by proceeding to a pick-up location of the ride order.

In some embodiments, a method for ride order dispatching may comprise inputting information on a location of a vehicle and a time (e.g., a time-of-day) to a trained neural network model; and based on a policy generated from the trained neural network model, obtaining action information for the vehicle. The action information may comprise: staying at a current position of the vehicle, re-positioning the vehicle, accepting a ride order, or other actions. The neural network model comprises a deep neural network and reinforcement learning algorithm. The neural network model comprises one or more action inputs, one or more state inputs, and a state-action value output.

FIG. 1 illustrates an exemplary system 100 for dispatching ride order, in accordance with various embodiments. As shown in FIG. 1, the exemplary system 100 may comprise at least one computing system 102. The system 102 may be implemented on or as various devices such as mobile phone, tablet, server, computer, wearable device (smart watch), etc. The system 102 above may be installed with appropriate software (e.g., platform program, etc.) and/or hardware (e.g., wires, wireless connections, etc.) to access other devices of the system 100. The computing system 102 may include one or more processors 104, one or more memories 106, and one or more network ports 105. The memory 106 may be non-transitory and computer-readable. The memories 106 may store instructions that, when executed by the one or more processors 104, cause the one or more processors 104 to perform various operations described herein. The one or more processors 104 and/or the one or more memories 106 may be implemented as one or more circuits described below with reference to FIG. 5. Further descriptions of the network ports 105 can also be referred to the network/communication interface 518 in FIG. 5.

The system 100 may include one or more data stores (e.g., a data store 108) and one or more computing devices (e.g., a computing device 109) that are accessible to the system 102. In some embodiments, the system 102 may be configured to obtain data (e.g., location, time, and fees for multiple vehicle transportation trips) from the data store 108 (e.g., a database or dataset of historical transportation trips) and/or the computing device 109 (e.g., a computer, a server, a mobile phone used by a driver or passenger that captures transportation trip information such as time, location, and fees). The system 102 may use the obtained data to train the model for ride order dispatching. The location may comprise GPS (Global Positioning System) coordinates of a vehicle.

The system 100 may further include one or more computing devices (e.g., computing devices 110 and 111) coupled to the system 102. The computing devices 110 and 111 may comprise devices such as cellphone, tablet, computer, wearable device (smart watch), etc. The computing devices 110 and 111 may transmit or receive data to or from the system 102. Thus, in various embodiments, the system 102 may be referred to as a ride order dispatching system that comprises one or more network ports to communicate with user terminals (e.g., computing devices 110 and 111) registered with an online transportation service platform, and one or more circuits coupled to the one or more network ports. During operation the circuits may perform various methods and steps described herein.

In some embodiments, the system 102 may implement an online information or service platform. The service may be associated with vehicles such as cars, bikes, boats, and airplanes, and the platform may be referred to as a vehicle (service hailing or ride order dispatching) platform. The platform may accept requests for transportation, identify vehicles to fulfill the requests, arrange for pick-ups, and process transactions. For example, a user may use the computing device 110 (e.g., a mobile phone installed with a software application associated with the platform) to request transportation from the platform. The system 102 may receive the request and relay it to various vehicle drivers, for example, by posting the request to mobile phones carried by the drivers. A vehicle driver may use the computing device 111 (e.g., another mobile phone installed with the application associated with the platform) to accept the posted transportation request and obtain pick-up location information. Fees such as transportation fees can be transacted among the system 102 and the computing devices 110 and 111. Some platform data may be stored in the memory 106 or retrievable from the data store 108 and/or the computing devices 109, 110, and 111. For example, for each trip, the location of the origin and destination (e.g., transmitted by the computing device 111), the fee, and the time can be obtained by the system 102.

In some embodiments, the system 102 and the one or more of the computing devices (e.g., the computing device 109) may be integrated in a single device or system. Alternatively, the system 102 and the one or more computing devices may operate as separate devices. The data store(s) may be anywhere accessible to the system 102, for example, in the memory 106, in the computing device 109, in another device (e.g., network storage device) coupled to the system 102, or another storage location (e.g., cloud-based storage system, network file system, etc.), etc. Although the system 102 and the computing device 109 are shown as single components in this figure, it is appreciated that the system 102 and the computing device 109 can be implemented as single devices or multiple devices coupled together. The system 102 may be implemented as a single system or multiple systems coupled to each other. In general, the system 102, the computing device 109, the data store 108, and the computing device 110 and 111 may be able to communicate with one another through one or more wired or wireless networks (e.g., the Internet) through which data can be communicated. Various aspects of the system 100 are described below in reference to FIG. 2 to FIG. 5.

Figure 2:
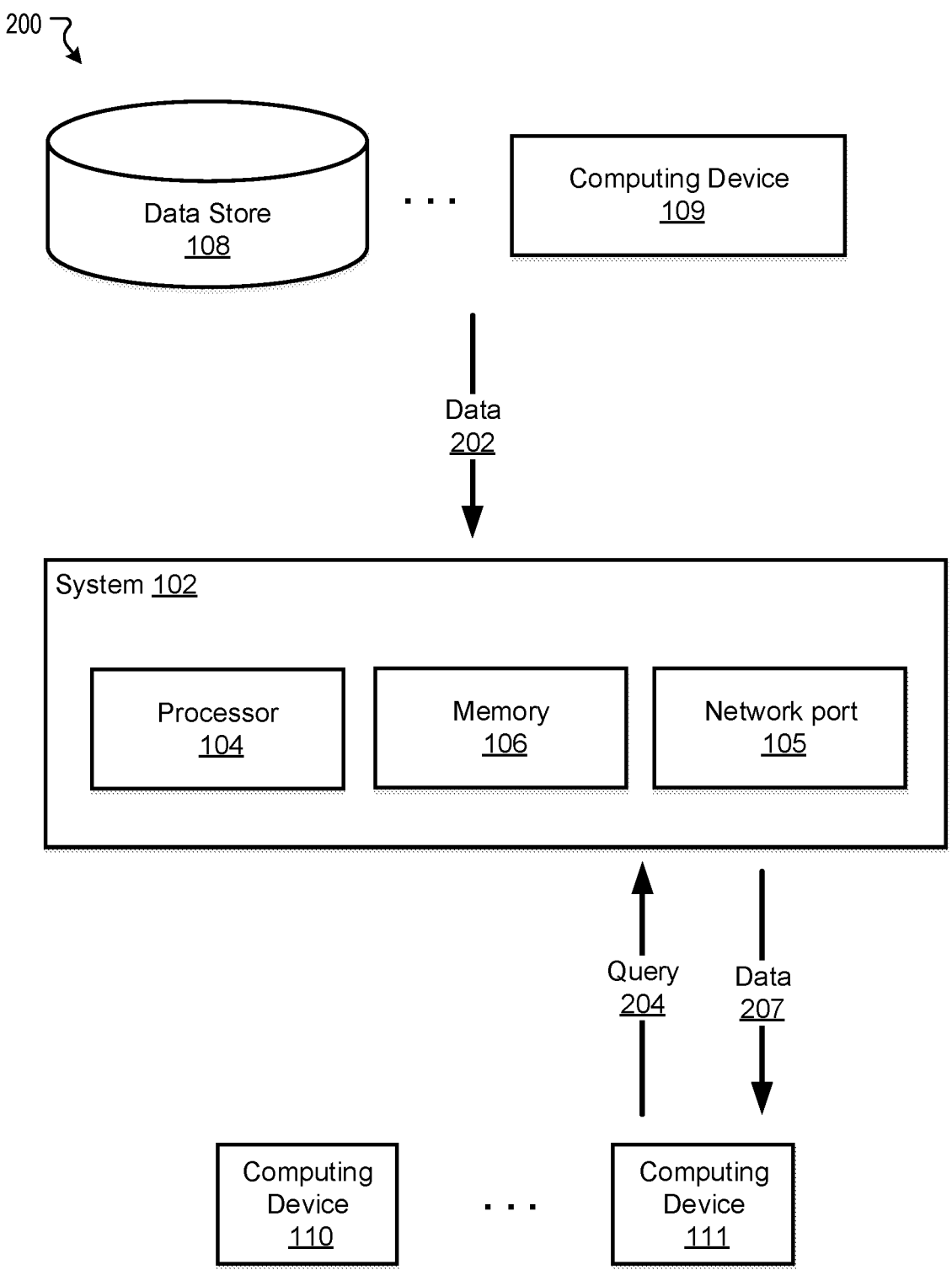
FIG. 2 illustrates an exemplary system for ride order dispatching, in accordance with various embodiments.

FIG. 2 illustrates an exemplary system 200 for dispatching ride order, in accordance with various embodiments. The operations shown in FIG. 2 and presented below are intended to be illustrative.

In various embodiments, the system 102 may perform the following: obtaining, from a computing device, a current location of a vehicle; inputting the current location of the vehicle and a time to a trained neural network model to obtain action information for the vehicle, the action information comprising: staying at the current location of the vehicle, re-positioning the vehicle, or accepting a ride order; and transmitting the action information to the computing device to cause the vehicle to stay at the current location, re-position to another location, or accept the ride order by proceeding to a pick-up location of the ride order.

In some embodiments, the system 102 may obtain data 202 (e.g., training data comprising the state, action, and reward described below for historical trips) from the data store 108 and/or the computing device 109. The historical trips may be completed by various vehicles, and associated trip information such as trip origin, destination, and fee may be collected from devices such as the system 102, computing device 110, computing device 111, etc. The obtained data 202 may be stored in the memory 106. The system 102 may train a model with the obtained data 202 or train an algorithm with the obtained data 202 to learn a model for dispatching ride order. The algorithm of learning a model without providing a model may be referred to as model-free reinforcement learning algorithm.

The computing device 111 may transmit query 204 to the system 102. The computing device 111 may be associated with a driver of a service vehicle including, for example, taxis, service-hailing vehicle, etc. The query 204 may comprise information such as a current location of the vehicle, a current time, etc. Alternatively, the query 204 may not comprise the location of the vehicle and the current time. In response to the query 204, the system 102 may obtain the location of the vehicle from the computing device 111 and obtain the current time from any source. Accordingly, the system 102 may send data 207 to the computing device 111 or one or more other devices. The data 207 may comprise an instruction or recommendation for an action, such as waiting at the current position, re-positioning to another location, accepting a new request, etc. The data 207 may be displayed or played on the computing device 111, for example, as a visual and/or audio message. Alternatively, the computing device 111 may be an in-vehicle processor which effectuates motion control of the vehicle according to the data 207.

As mentioned, the machine learning algorithm used by the disclosed systems and methods may comprise a combination of modified (e.g., deep neural network (DNN)) and reinforcement learning (RL) algorithm. The RL algorithm may be model-free with function approximation, e.g., in a deep Q-network (DQN) framework, where the state-action value function is approximated by a multi-layer neural network or multi-layer perceptron (MLP). A resulting Q-network can be used as a component in a multi-driver dispatching system. In various embodiments, to produce an optimal policy that governs the decision-making at each step, a corresponding state-action value function (described below) of the driver may be estimated. This function can show how good a decision made at a particular location and time of the day with respect to the long-term objective. The machine learning algorithm or a system or device that at least partially implements the machine learning algorithm may be referred to as an "agent." For training, the agent takes an action in a defined environment, a reward can be assigned for a given behavior (e.g., a ride fee for fulfilling a ride order, nothing for waiting) assuming that the vehicle driver follows the determination of the agent, and over time through reinforcement learning algorithm, the agent can learn to reproduce that behavior to maximize the rewards and help the vehicle driver make the best decisions.

Figure 3A:
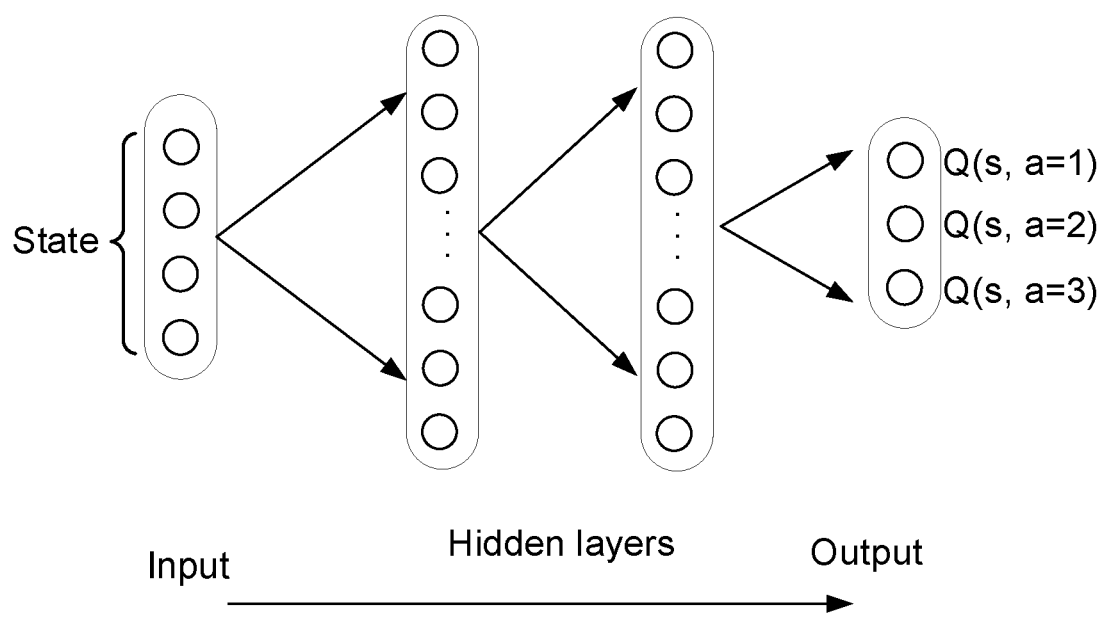
FIG. 3A illustrates an exemplary neural network model, in accordance with various embodiments.
Figure 3B:
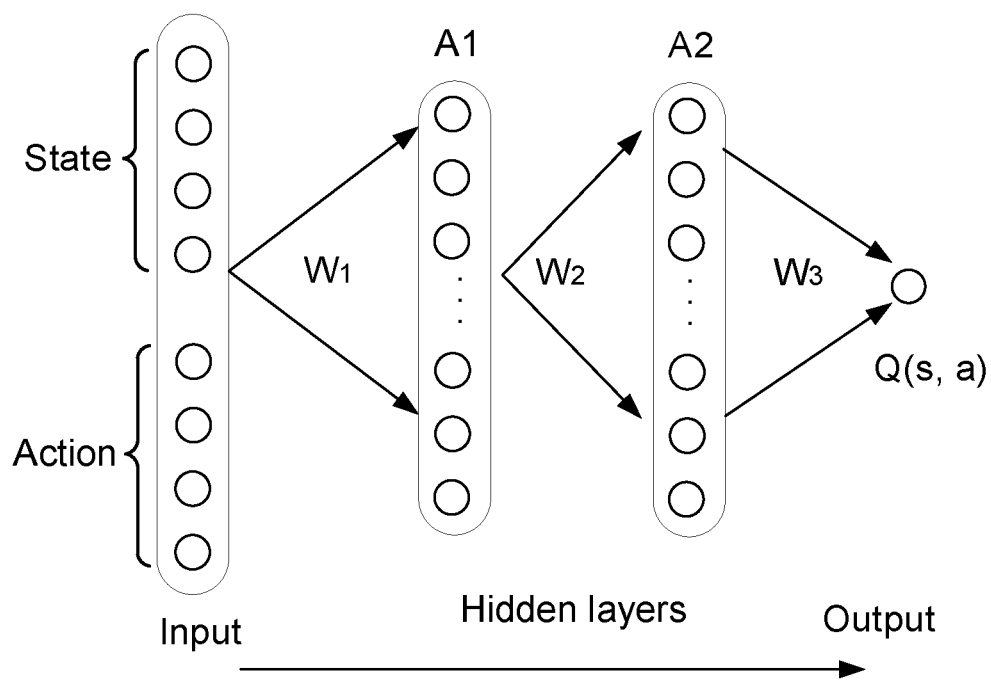
FIG. 3B illustrates an exemplary neural network model for ride order dispatching, in accordance with various embodiments.

In deep neural networks, neurons may serve as the basic building block. A neuron may receive an input signal (e.g., input data), process it using a logistic computation function, and transmit an output signal (e.g., output data) depending on the computation outcome. When these neurons are arranged into networks of neurons, they are termed as neural networks. Each column of neurons in the network is called a layer, and a network can have multiple layers with multiple neurons in each layer. Network with single neuron is called perceptron and network with multiple layers of neurons is called multi-layer perceptron (MLP). For example, a two hidden layer MLPs (layer $A_1$ and layer $A_2$) are shown in FIG. 3B, where the input layer comprises the inputs (state inputs and action inputs) to the network. The input layer is also called the visible layer because this may be the only exposed part of the network. Hidden layers derive features from the input layer at different scales or resolutions to form high-level features and output a value or a vector of values at the output layer. At each hidden layer, the network may compute the features as:

$$A_1 = f(W_1 * X)$$

$$A_2 = f(W_2 * A_1)$$

$$Q = f(W_3 * A_2)$$

Where, f is the function which takes the combination of weights (e.g., $W_1$, $W_2$, $W_3$) and outputs at the previous layer and outputs a value. Function f can be identical for all the hidden layers or can be different. A1, A2, and Q are the successive outputs of first hidden layer, second hidden layer, and the final output layer. For a given row of data X as an input to network, the network may process the input to obtain A1, A2 and finally obtain the predicted output Q. This can be called forward pass.

The weights of the neural network need to be updated by training to accurately reflect the decision making process. In a regular DNN, the predicted output Q can be compared with an expected output (e.g., independently verified result, manually obtained result, cross-checked result) to compute an error using a loss function. This error is then propagated back through the network using a backpropagation algorithm to update the weights $W_1$, $W_2$, $W_3$ for each layer according to stochastic gradient descent, one layer at a time. This can be called backward pass. In some embodiments, RL algorithm is used in combination with DNN to compute a loss function based on target and prediction and based on which, update the weights of neural network using backpropagation, as detailed below.

A RL algorithm builds on a Markov decision process (MDP), and the environment for ride order dispatching can be formulated as a MDP. In various embodiments, the agent interacts with the environment in discrete steps. At each step, the agent executes an action (e.g., waiting, re-positioning, accepting a ride order), and correspondingly from the environment, the agent receives an observation (e.g., a reward and a next state described below). That is, the agent chooses an action from a set of available actions, and the agent moves to a new state, and the reward associated with the transition is determined. In one exemplary transition, the driver is matched to a trip order, spends time to travel to the trip origin location, and the trip moves the driver to the destination location and time, for which the driver earns an immediate reward (trip fee) from this transition. The goal of the agent is to collect as much reward as possible. To further describe the MDP formulation, some of the terminologies are described below. The disclosed MDP formulation uses more granular state and action information and learns a state-action value function.

State, s: the geo-coordinates of the driver and time (e.g., time-of-day in seconds) when the driver picks up a trip order. For example, s=(l, t), where "l" is the GPS coordinates pair (latitude, longitude), and "t" is time. "s" may be different from the actual origin of the transportation trip corresponding to the picked trip order. "s" may contain additional features that characterize the spatio-temporal space (l, t), e.g., statistics of demand, supply, and order fulfillment within the vicinity of (l, t), denoted as "f". For example, s could be extended as (l, t, f). Further, time for weekday and weekend can be differentiated due to different transportation demands and patterns.

Action, a: the action is assignment (e.g., passenger pick-up and transportation assignment) of a particular trip to the driver, defined by the trip destination and drop-off time. Hence, a state-action pair is ($s_0$, $s_1$).

Reward, r: the total fee collected for the trip.

Episode: one complete day, from 0:00 am to 23:59 pm. Hence, a terminal state is a state with t component corresponding to 23:59 pm. Alternatively, other episode definitions for a time frame can be used.

State-action value function, Q(s, a): expected cumulative reward that the driver will gain till the end of an episode if the vehicle driver starts at state s and takes an action a. Here, $Q(s, a) = E[\sum_{t=0}^{T} \gamma^t R(S_t, A_t) | S_0 = s, A_0 = a]$, where S, A, and R are stochastic variable version of s, a, and r. T is the number of steps till the terminal state, and $\gamma$ is the discount factor for the future rewards. In the training of the disclosed systems and methods, $\alpha$ can be set, for example, to 0.9. The state-action value function can be also referred to as Q function or Q value. This Q-value function gives the expected total reward for performing action "a" at state "s," under policy "$\pi$" (described below), with discount factor "$\gamma$."

State value function, V(s): expected cumulative reward that the driver will gain till the end of an episode if the driver starts at state "s." Assuming that a greedy policy with respect to the Q function is used, the state value $V(s) = \max_{a \in A} Q(s, a)$.

Policy, $\pi(a|s)$: a function that maps a state s to a distribution over the action space (stochastic policy) or a particular action (deterministic policy). The greedy policy with respect to a learned Q(s, a) is given by $\pi(s) = \max_a Q(s, a)$.

In various embodiments, action search can be added to an existing DQN framework to obtain an improved neural network architecture. FIG. 3A illustrates an example DQN without action search. The DQN assumes a small discrete action space and uses only the state as input and multiple outputs corresponding to the action value for each action (e.g., Q(s, a=1), Q(s, a=2), and Q(s, a=3)). The maximum of the outputs is used to update the neural network.

FIG. 3B illustrates an exemplary neural network model (DQN with action search) for ride order dispatching, in accordance with various embodiments. In some embodiments, the neural network model comprises: an input layer comprising one or more action inputs and one or more state inputs, one or more hidden layers, and an output layer comprising a state-action value output. The action comprises a destination and a drop-off time associated with performing a vehicle trip. The state comprises geo-coordinates of the vehicle and a pick-up time associated with the vehicle trip. The state-action value comprises a cumulative reward. The input layers, the hidden layers, and the output layer are in a sequence and every two neighbor layers are associated with one or more weights. The exemplary DQN with action search for ride order dispatching shown in FIG. 3B may be applied to the various machine learning algorithms or models described herein. In the architecture shown in FIG. 3B, both state "s" and action "a" are used as the network inputs to obtain the Q-value as the single output. The hidden layers can be fully-connected layers or convolutional layers, depending on the application. There can be many more hidden layers than those two shown in FIG. 3B. A pseudo code (Algorithm 1) for training is provided in FIG. 3D. The description of DQN below may refer to the DQN in FIG. 3B.

In some embodiments, the neural network model is trained by: modeling the vehicle trips by passing the action inputs and state inputs through the hidden layers to obtain the output, each vehicle trip associated with a first state corresponding to an origin, a second state corresponding to a destination, an action corresponding to fulfilling a ride order from the origin to the destination, and a reward corresponding to fees for the ride; and updating the weights to maximize the cumulative reward.

The DQN (e.g., embodied in the state-action value function) is to be trained with training data for various episodes until, for example, the state-action value function converges. The network can be updated after each taken action or in mini-batches of, for example, a few actions taken. Each mini-batch can be viewed as a small set of sample points on the state-action (Q) value function. Such mini-batches would be highly correlated. Previous experiences can be kept in memory (e.g., the memory 106 described above), and after each action taken, a mini-batch of experiences can be drawn from that memory to perform the update. In one example, the mini-batch update through backpropagation solves a bootstrapped regression problem with the following loss function in the DQN framework:

$$\left(Q(s_0, a | \theta) - r(s_0, a) - \gamma \max_{a' \in A} Q(s_1, a' | \theta')\right)^2 \quad (1)$$

where $\theta'$ comprises the weights for the Q-network of the previous iteration (similar to the weights $W_1$, $W_2$ described above for the corresponding layer), and A is the action space. Here, $Q(s_0, a|\theta)$ may represent the prediction: the approximated Q function of the neural network with predicted weights $\theta$; and $$r(s_0, a) + \gamma \max_{a' \in A} Q(s_1, a' | \theta')$$

may represent the targets. The loss function can be used to update the neural network, for example, $\theta'$ can be updated with $\theta$.

To further improve training stability, double-DQN can be used. For example, a target Q-network $\hat{Q}$, is maintained and synchronized periodically with the original Q-network. The targets in (1) is modified so that the argmax is evaluated by the target network:

$$r(s_0, a) + \gamma \hat{Q}\left(s_1, \arg \max_{a' \in A} Q(s_1, a' | \theta') | \hat{\theta}'\right) \quad (2)$$

That is, the deep neural network may comprise two deep-Q networks. The targets $$r(s_0, a) + \gamma \max_{a' \in A} Q(s_1, a' | \theta')$$

in (1) can be replaced by (2), and the difference between (2) and Q ($s_0$, a|$\theta$) can be used to update the neural network.

In some embodiments with respect to data training, different from the vanilla DQN algorithm, no simulation environment may be involved in training, and the agent is trained on historical data. For example, historical trips data can be used as training transitions (training data). Since DQN is an off-policy algorithm, learning the value of the optimal policy can be performed independently of the agent's online actions to generate the training data. Each trip x defines a transition of the agent's states ($s_0$, a, r, $s_1$), where current state $s_0 = (l_0, t_0)$ comprises the vehicle driver's location and time when the action is performed, the action a comprises the assigned trip, the reward is the total fee collected for this trip, and the next state $s_1 = (l_1, t_1)$ is the drop-off location and time. Since an episode is defined by a day, $s_1$ can be set in all those transitions where the trip crosses midnight to be terminal state. All state vectors may be pre-processed, for example, normalized with their population mean and standard deviation. These transitions (experiences) can be stored in a replay memory, and each iteration samples a mini-batch from this replay memory. For use as the training data, the transitions may not be generated from a simulator and may not form complete episodes. Thus, data used for training the neural network model may comprise: (a) a plurality of the vehicle trips each associated with a measurement period, and (b) one or more terminal states each associated with an end of the measurement period.

In some embodiments with respect to action search, the action search can be incorporated to the disclosed system and methods, and an action takes the form a=(l, t). Since both the GPS coordinates and time are more or less continuous, computing the max-Q term in (1) exactly may not be tractable. In addition, the time (t-component) has dependency on the location (l-component) as it reflects the duration of the trip. Thus, random sampling from the action space may not be appropriate. In some embodiments, an approximation scheme can be used for computing action "a" by constructing an approximate feasible space for the actions, $\hat{A}(s)$, which makes explicit the dependency of the action space to the state "s" where the search starts. Instead of searching through all valid actions, the historical trips originating from the vicinity of s (e.g., within a threshold distance from s) can be searched:

$$\hat{A}(s) = \{x_{s_1} | x \in \chi, B(x_{s_0}) = B(s)\} \quad (3)$$

where $\chi$ is the set of all trips, and B(s) is a discretized spatio-temporal bin that s falls into. For spatial discretization, the hexagon bin system can be used, and here, a hexagon bin can be represented by its center point coordinates. $x_{s_0}$ is the $s_0$ component of the trip x. For a larger search space, more computation is required for evaluating the value network at each action point. The number of actions allowed in the action search space can be tuned, and random sampling can be performed without replacement if necessary. The same search procedure can be used for policy evaluation, where the driver's trajectory for the day is simulated using historical trips data. Therefore, in some embodiments, modeling the vehicle trips comprises: modeling a first vehicle trip to obtain the second state associated with the first vehicle trip, and searching from a spatio-temporal space to obtain an action to perform at the second state, the spatio-temporal space is within a spatial threshold and/or a temporal threshold from the second state.

Figure 3C:
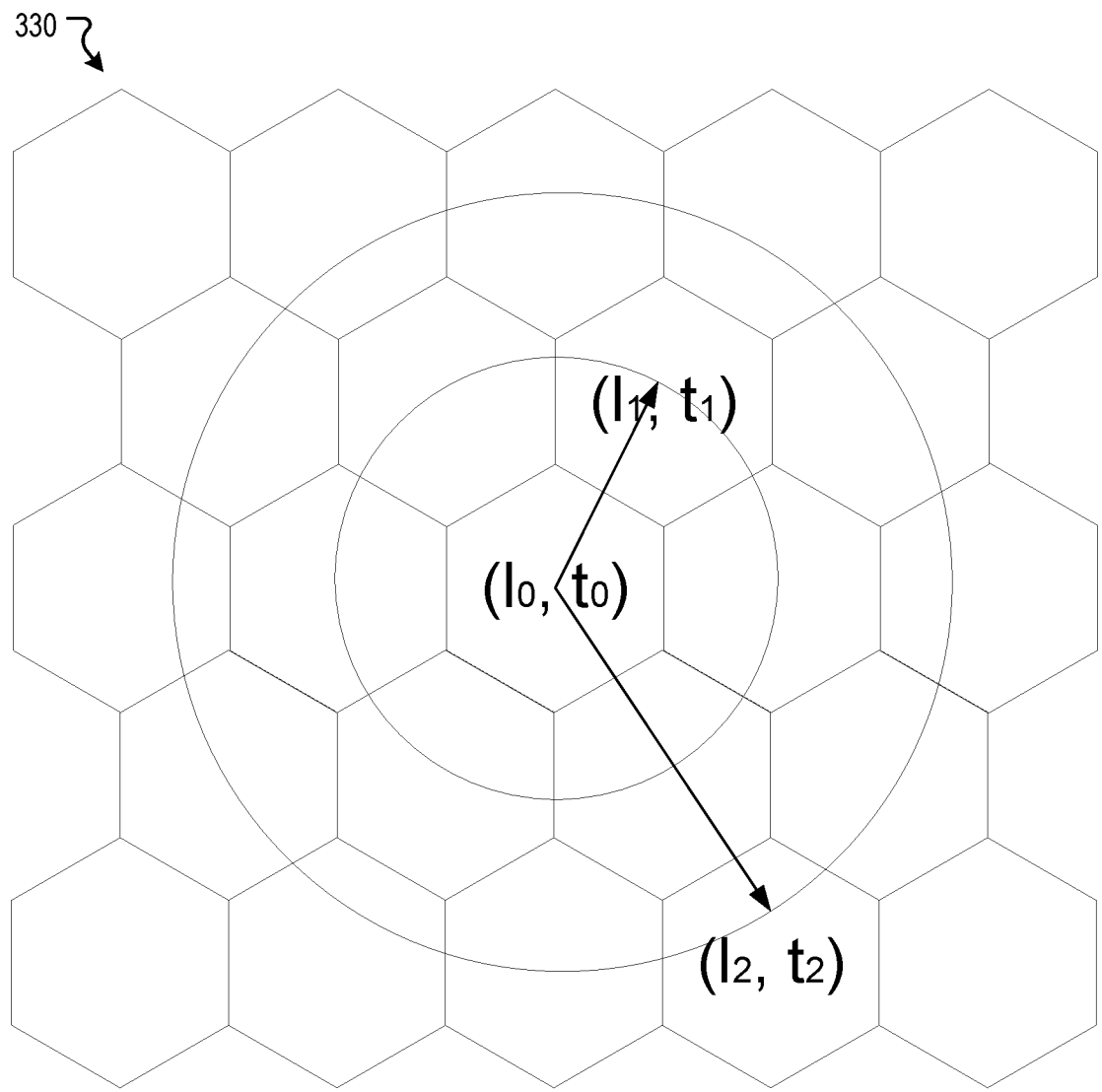
FIG. 3C illustrates an example action search for ride order dispatching, in accordance with various embodiments.

In some embodiments with respect to expanded action search, due to training data sparsity in certain spatio-temporal regions, e.g., remote areas in early morning, the above-described action search may return an empty set. Therefore, in some embodiments, an expanded action search can be performed in both spatial and temporal spaces. In one example, a first search direction is to stay at the last drop-off location and wait for a period of time, which corresponds to keeping the l-component ($s_l$) constant and advancing $s_t$, till one of the following happens with s' being the searched state: (1) $\hat{A}(s')$ is non-empty, (2) a terminal state is reached, or (3) $s'_t$ exceeds the wait-time limit. For (1), $\hat{A}(s')$ is returned; for (2), the terminal state is returned; and for (3), s' is returned. In another example, a second search direction is through spatial expansion by searching the neighboring hexagon bins of s. The expanded action search may be in a layered manner, as shown in FIG. 3C. In FIG. 3C, the circle lines cover the first two layers of neighboring hexagon bins of $l_0$, and the arrows represent searches to hexagon bin centered at $l_1$ (first layer) at time $t_1 > t_0$ and hexagon bin centered at $l_2$ at time $t_2 > t_1$. The spatio-temporal bins covered by the inner red circle are B'(($l_0$, $t_0$), 1).

For each layer L of hexagon bins, the search can be performed within the appropriate time interval to take into account the travel time required to reach the target hexagon bin from s. The travel time estimation can be obtained from a map service. The layer L neighboring spatio-temporal bins of s can be denoted by B'(s, L), and the set of historical trips originating from any of the bins in B'(s, L) can be denoted by:

$$\hat{A}'(s,L) = \{x_{s_1} | x \in X, B(x_{s_0}) \in B'(s,L)\} \quad (4)$$

The increase of L in the second search direction is stopped when $\hat{A}(s, L)$ is non-empty, and $\hat{A}(s, L)$ is returned. Otherwise, B'(s, $L_{max}$), the hexagon bins' center points and their associated time components, are returned. Algorithm 2 in FIG. 3E summarizes the action search.

In some embodiments with respect to terminal state values, based on the definition of terminal state described above, Q(s, a) with $s_t$ near the end of the episode horizon would be close to zero regardless $s_l$. Thus, transitions with $s_l$ being a terminal state may be added to the replay buffer at the very beginning of training to help getting the terminal state-action values right early in training. This can help improve the model accuracy because the target values for the states $s_0$'s in the mini-batch updates of DQN are computed through bootstrapping on the values of states that are temporally after them. Since the training samples with a terminal state may form a small percentage of the entire data set, a uniform sampling would cause the values of many states far away from the terminals to be supervised with the incorrect targets, hence slowing down the learning process. Therefore, in some embodiments, data used for the training the neural network model comprises (1) a plurality of the vehicle trips each associated with a measurement period (e.g., episode), and (2) one or more terminal states each associated with an end of the measurement period.

In some embodiments with respect to experience augmentation, the original training data is the experience generated by the given historical policy. The historical policy may not explore the trajectory space well and may contain very few rare but important cases, such as transitions that require long waiting time or repositioning without a passenger before a trip starts. Such transitions are typical experiences when the driver is at a state, where few trips historically originated from. If the agent is only trained on the original trips data, it would not learn to make good decisions should the driver go into a rare state in the future (e.g., when the vehicle goes to an area where very few people request vehicle services and tries to pick up a vehicle request). Therefore, the original training experience may be supplemented with transitions obtained through action search. For example, for each time bin, a set of locations within the geographical boundary under consideration are randomly sampled. Accordingly, the action search and the expanded action search described above can be performed on the randomly sampled states, and the resulting transitions which require expanded action search can be added to the replay memory.

In some embodiments with respect to policy evaluation, the trained neural network provides a policy that beats the existing decision-making data in terms of cumulative reward, and the policy can be evaluated by the following method. Since the transitions data is historical and may not necessarily form complete episodes, a single-driver simulator can be built from the past trips data for evaluating the policy generated from the learned value function. For example, it can be assumed that after a driver drops off a passenger at the destination, and from the vicinity of the destination, the driver would be assigned a new trip request. The search space can be augmented as necessary following the expanded action search described above to cover the cases where there are no historical trip around the last drop-off area. The next move is selected by the given policy from the action search output, which may comprise fee-generating trips, wait actions, or re-position actions. The reward associated with the action is the actual trip fee, if the action involves a historical trip. Otherwise, the reward is zero (for waiting or repositioning). The simulation can be run for multiple episodes (days), and the cumulative reward gained can be computed and averaged over the episodes.

In some simulations, a first policy (a greedy policy with respect to the learned state-action value function, the greedy policy may be a policy that fully exploits the learnt Q values) and a second policy (a policy that takes random action within the action search space) may be evaluated. The second policy may reflect the policy that generated the historical data. And the first policy has shown higher (e.g., 10-20%) gain than the second policy (also the historical policy). Thus, the first policy can be used to implement automatic ride order (vehicle request) dispatching to help vehicle drivers maximize their earnings.

Figure 3F:
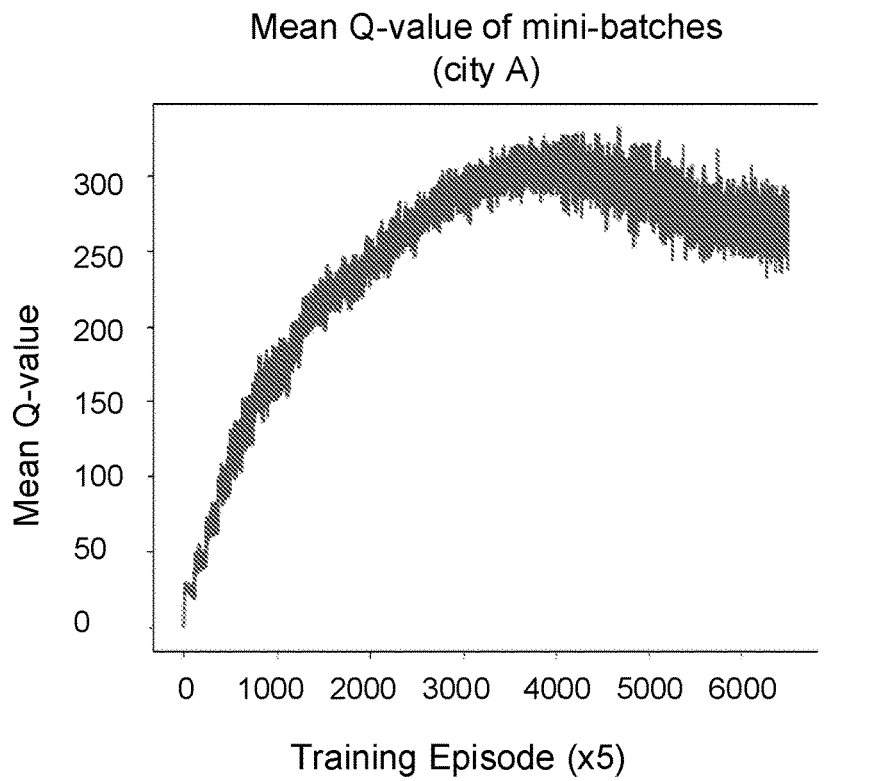
FIG. 3F illustrates mean Q-values on mini-batches for city A and city B, in accordance with various embodiments.
Figure 3F:
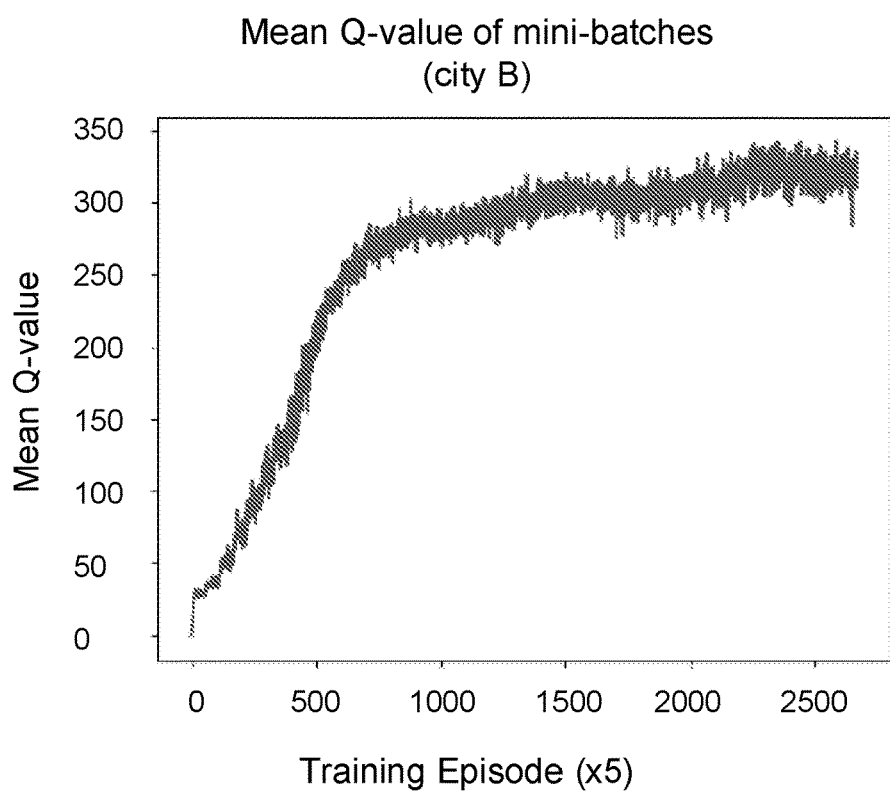
Figure 3G:
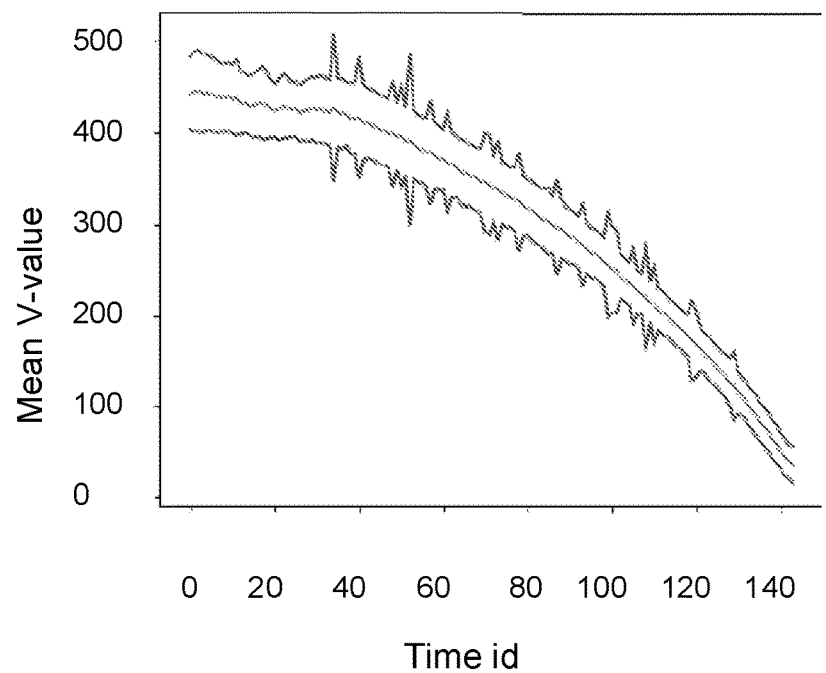
FIG. 3G illustrates mean state-values by time for city A and city B, in accordance with various embodiments.
Figure 3G:
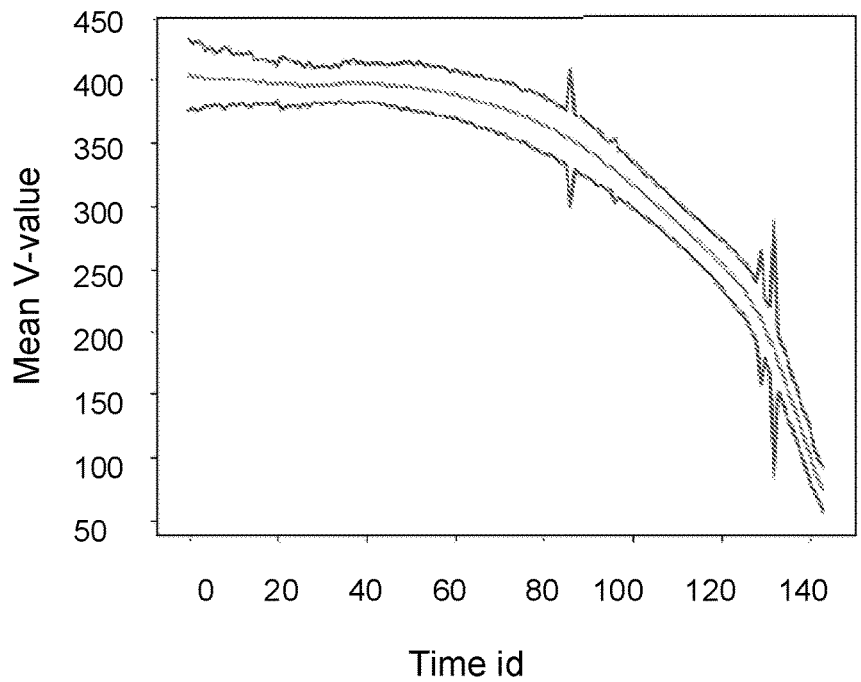
Figure 3H:
FIG. 3H-FIG. 3K illustrate state-values by locations in city A and city B, in accordance with various embodiments.
Figure 3H:
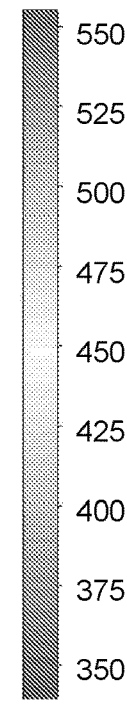
Figure 3H:
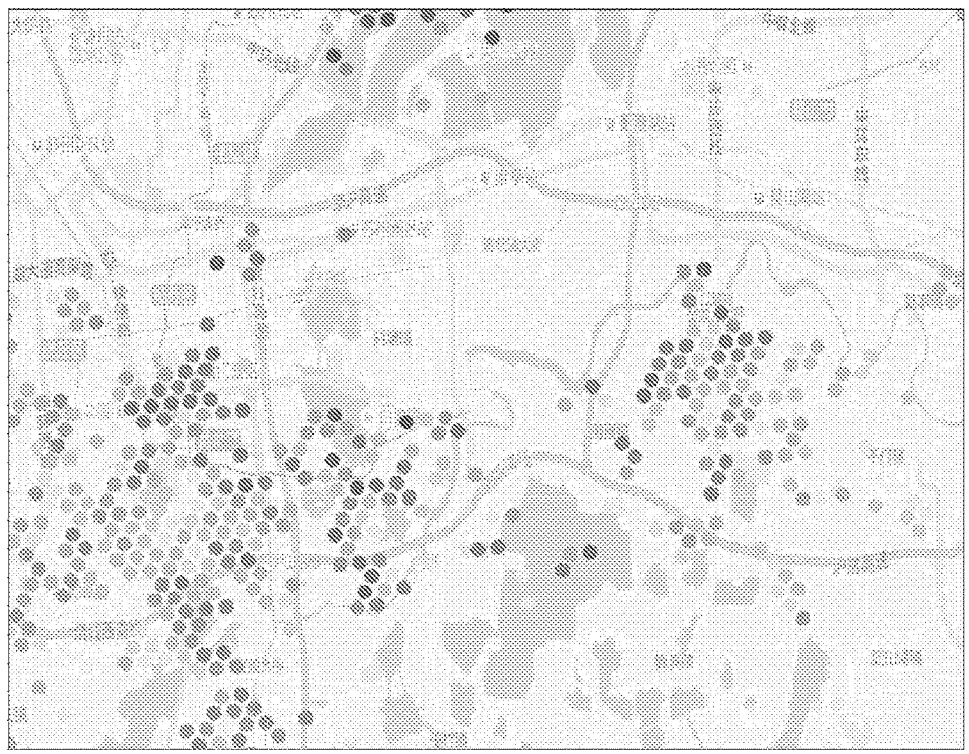
Figure 3H:
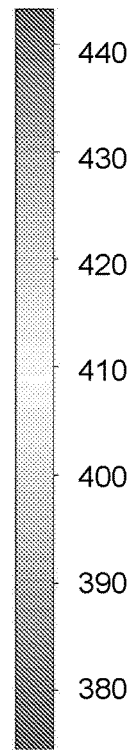
Figure 3I:
Figure 3I:
Figure 3J:
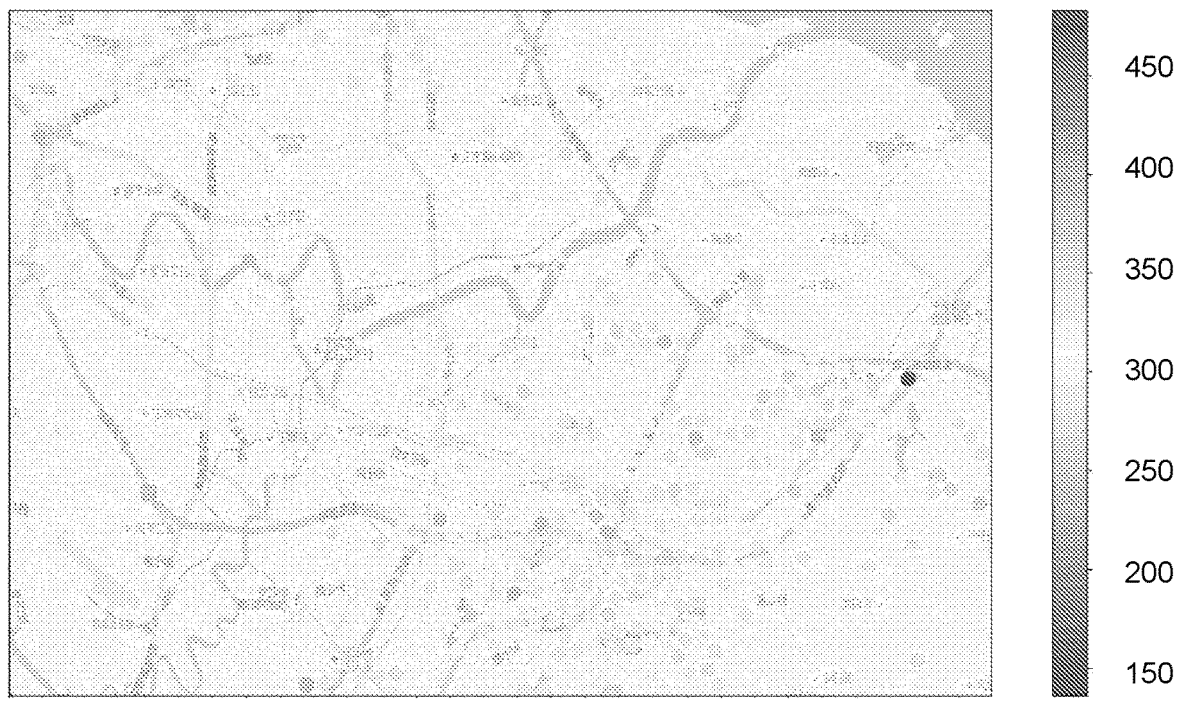
Figure 3J:
Figure 3K:
Figure 3K:

In one example, a neural network for Q value function is trained with one month of Express Car weekday trips data from two mid-sized cities (city A and city B). Each mini-batch can be viewed as a small set of sample points on the Q (state-action) value function. A discount factor of 0.9 may be used. All state vectors with their population mean and standard deviation may be normalized. This pre-processing may be necessary for a stable training. As shown in FIG. 3F, after 30000 episodes, the Q function has converged. FIG. 3G shows the mean V(s) with one standard deviation over the center points for each time bin and for all location bins. The value network correctly captures the trend in the temporal space: the average value monotonically decreases over time, and the value at the final time bin is close to zero.

In some embodiments, for the spatial trend captured by the value network. FIG. 3H to FIG. 3K illustrate the state-values by location in the test city for 4 am, 8 am, 2 pm, and 8 pm respectively. The grey scale coding is not comparable across plots.

Figure 3L:
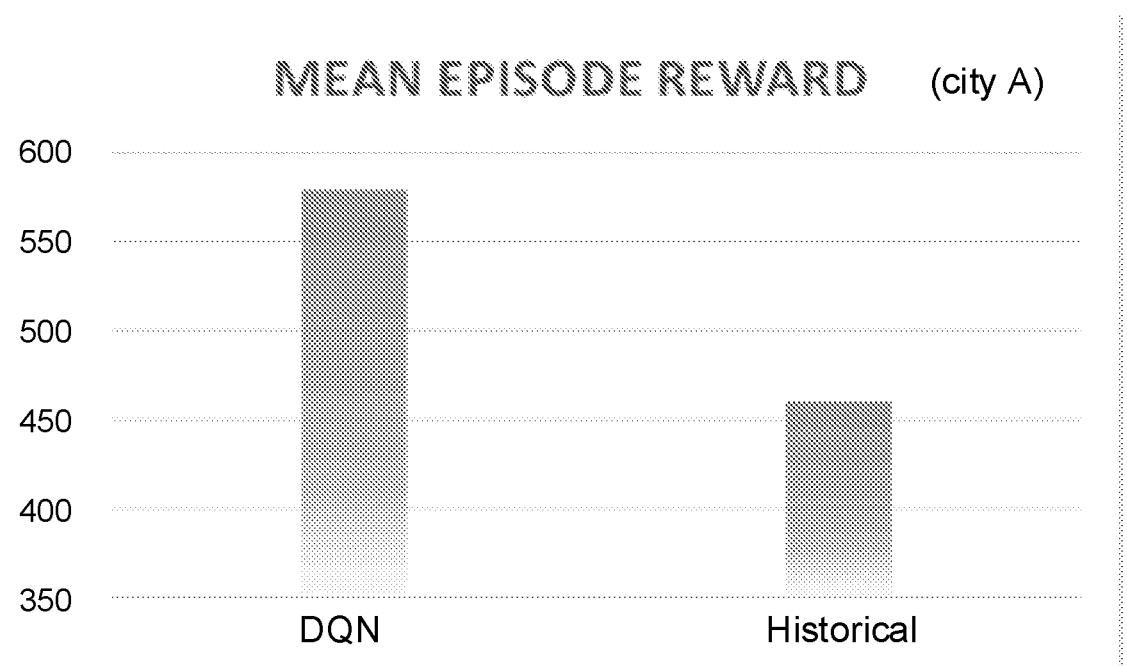
FIG. 3L illustrates mean episode reward comparison for city A and city B, in accordance with various embodiments.
Figure 3L:
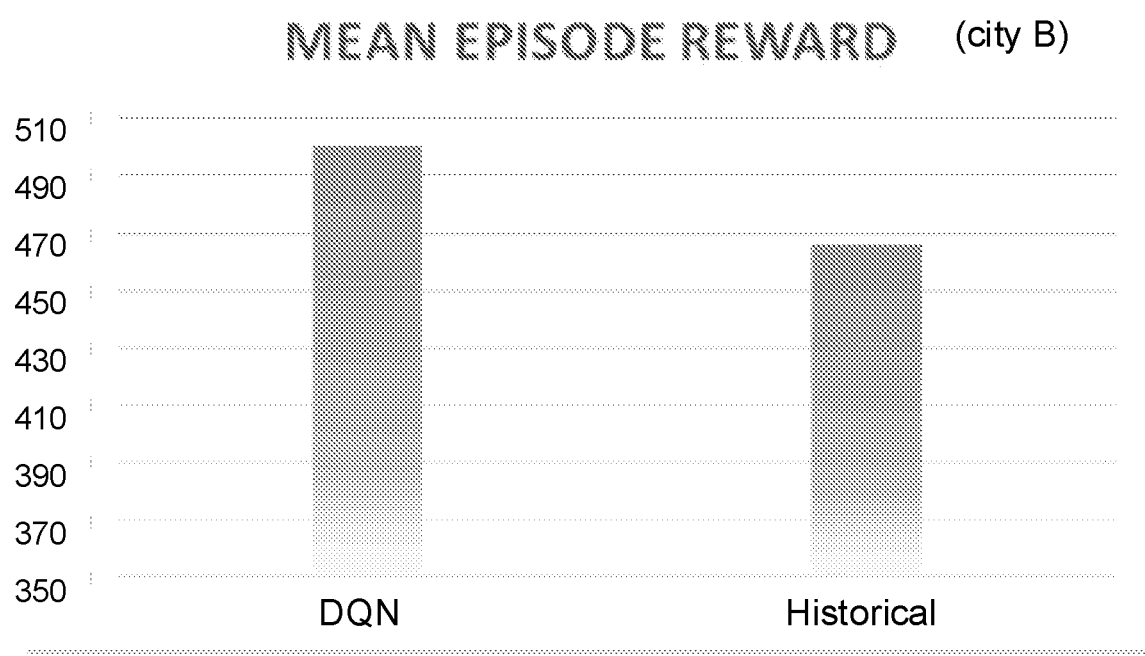

In some embodiments, the cumulative rewards from policy evaluation on two different policies for city A and city B are compared in FIG. 3L. The trips data backing the policy evaluation is from the same two cities in a different month. One is greedy with respect to the learned state-action value function. The other one takes a random action within the action search space. The second policy more or less reflects the policy that generated the historical data. The policy evaluation described above is used. The average episode reward is computed over 10 runs of 100 episodes with random starts. The average episode reward as shown in FIG. 3L for the policy learned by DQN is about 10% to 20% higher than the historical policy.

As such, the disclosed systems and methods may automate instructions for transportation-providing vehicles, through a combination of software and hardware improvement. The benefit is shown to be greater than historical policies.

Figure 4A:
FIG. 4A illustrates a flowchart of an exemplary method for ride order dispatching, in accordance with various embodiments.

FIG. 4A illustrates a flowchart of an exemplary method 400, according to various embodiments of the present disclosure. The method 400 may be implemented in various environments including, for example, the system 100 of FIG. 1. The exemplary method 400 may be implemented by one or more components of the system 102 (e.g., the processor 104, the memory 106) or the computing device 111 (e.g., a mobile phone associated with a vehicle driver). The exemplary method 400 may be implemented by multiple systems similar to the system 102. The operations of method 400 presented below are intended to be illustrative. Depending on the implementation, the exemplary method 400 may include additional, fewer, or alternative steps performed in various orders or in parallel.

At block 402, information on a location of a vehicle and a time (e.g., a time when the vehicle starts to look for ride orders or after fulfilling a ride order) may be input to a trained neural network algorithm. At block 404, based on a policy generated from the trained neural network algorithm, action information for the vehicle may be obtained. For example, the action information may comprise: staying at a current position of the vehicle (e.g., when a ride order is likely to be received at the current location soon), re-positioning the vehicle (e.g., to another place that a ride order or a more rewarding ride order is more likely), or accepting a ride order (e.g., when one or more rider orders are currently available). In some embodiments, the neural network algorithm comprises a deep neural network and reinforcement learning algorithm. The neural network algorithm comprises one or more action inputs, one or more state inputs, and a state-action value output.

FIG. 4B illustrates a flowchart of an exemplary method 450, according to various embodiments of the present disclosure. The method 450 may be implemented in various environments including, for example, the system 100 of FIG. 1. The exemplary method 450 may be implemented by one or more components of the system 102 (e.g., the processor 104, the memory 106). The exemplary method 450 may be implemented by multiple systems similar to the system 102. The operations of method 450 presented below are intended to be illustrative. Depending on the implementation, the exemplary method 450 may include additional, fewer, or alternative steps performed in various orders or in parallel.

Block 452 may comprise obtaining, from a computing device, a current location of a vehicle, the computing device being one of the user terminals. Block 454 may comprise inputting the current location of the vehicle and a time to a trained neural network model to obtain action information for the vehicle, the action information comprising: staying at the current location of the vehicle, re-positioning the vehicle, or accepting a ride order. Block 456 may comprise transmitting the action information to the computing device to cause the vehicle to stay at the current location, re-position to another location, or accept the ride order by proceeding to a pick-up location of the ride order.

In some embodiments, the neural network model comprises a deep neural network and a reinforcement learning algorithm, and the deep neural network comprises two deep-Q networks.

In some embodiments, the neural network model comprises: an input layer comprising one or more action inputs and one or more state inputs, one or more hidden layers, and an output layer comprising a state-action value output. The action comprises a destination and a drop-off time associated with performing a vehicle trip. The state comprises geo-coordinates of the vehicle and a pick-up time associated with the vehicle trip. The state-action value comprises a cumulative reward. The input layers, the hidden layers, and the output layer are in a sequence and every two neighbor layers are associated with one or more weights.

In some embodiments, the neural network model is trained by: modeling the vehicle trips by passing the action inputs and state inputs through the hidden layers to obtain the output, each vehicle trip associated with a first state corresponding to an origin, a second state corresponding to a destination, an action corresponding to fulfilling a ride order from the origin to the destination, and a reward corresponding to fees for the ride; and updating the weights to maximize the cumulative reward.

In some embodiments, modeling the vehicle trips comprises: modeling a first vehicle trip to obtain the second state associated with the first vehicle trip, and searching from a spatio-temporal space to obtain an action to perform at the second state, the spatio-temporal space is within a spatial threshold from the second state.

In some embodiments, modeling the vehicle trips comprises: modeling a first vehicle trip to obtain the second state associated with the first vehicle trip, and searching from a spatio-temporal space to obtain an action to perform at the second state, the spatio-temporal space is within a temporal threshold from the second state.

In some embodiments, data used for training the neural network model comprises (1) a plurality of the vehicle trips each associated with a measurement period, and (2) one or more terminal states each associated with an end of the measurement period.

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
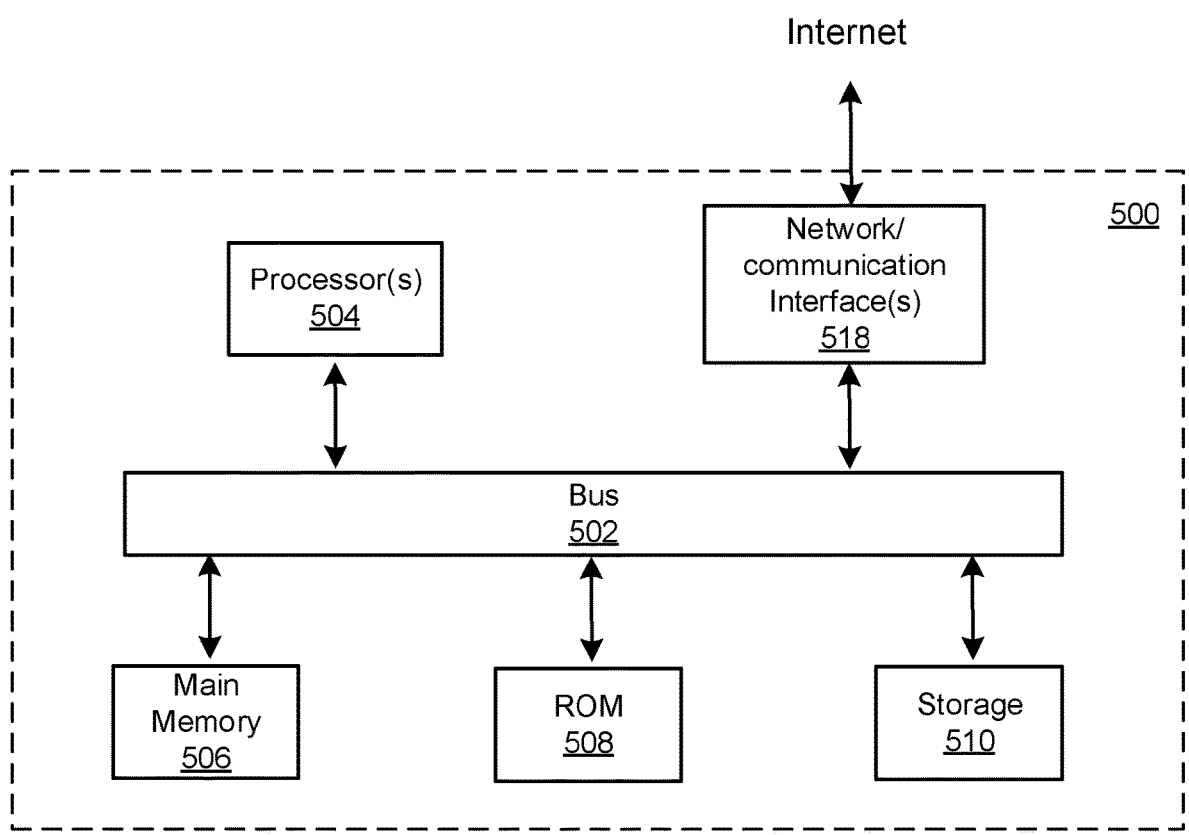
FIG. 5 illustrates a block diagram of an example computer system in which any of the embodiments described herein may be implemented.

FIG. 5 is a block diagram that illustrates a computer system 500 upon which any of the embodiments described herein may be implemented. The system 500 may correspond to the system 102 described above. The computer system 500 includes a bus 502 or other communication mechanism for communicating information, one or more hardware processors 504 coupled with bus 502 for processing information. Hardware processor(s) 504 may be, for example, one or more general purpose microprocessors. The processor(s) 504 may correspond to the processor 104 described above.

The computer system 500 also includes a main memory 506, such as a random access memory (RAM), cache and/or other dynamic storage devices, coupled to bus 502 for storing information and instructions to be executed by processor(s) 504. Main memory 506 also may be used for storing temporary variables or other intermediate information during execution of instructions to be executed by processor(s) 504. Such instructions, when stored in storage media accessible to processor(s) 504, render computer system 500 into a special-purpose machine that is customized to perform the operations specified in the instructions. The computer system 500 further includes a read only memory (ROM) 508 or other static storage device coupled to bus 502 for storing static information and instructions for processor(s) 504. A storage device 510, such as a magnetic disk, optical disk, or USB thumb drive (Flash drive), etc., is provided and coupled to bus 502 for storing information and instructions. The main memory 506, the ROM 508, and/or the storage 510 may correspond to the memory 106 described above.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a network/communication interface 518 coupled to bus 502. Communication interface 518 provides a two-way data communication coupling to one or more network links that are connected to one or more local networks. The communication interface 518 may be implemented as one or more network ports. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor(s) 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed exemplary embodiments. The exemplary systems and components described herein may be configured differently than described. For example, elements may be added to, removed from, or rearranged compared to the disclosed exemplary embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines.

In some exemplary embodiments, the processors or processor-implemented engines may be located in a single geographic location (e.g., within a home environment, an office environment, or a server farm). In other exemplary embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific exemplary embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A ride order dispatching system, comprising:
a processor; and
a non-transitory computer-readable storage medium storing instructions that, when executed by the processor, cause the processor to perform a method comprising:
obtaining, from a computing device, a current location of a vehicle;
inputting the current location of the vehicle and a time to a trained neural network model to obtain action information for the vehicle, the action information comprising:
staying at the current location of the vehicle, re-positioning the vehicle, or accepting a ride order; and
transmitting the action information to the computing device to cause the vehicle to stay at the current location, re-position to another location, or accept the ride order by proceeding to a pick-up location of the ride order,
wherein the neural network model comprises an input layer for receiving one or more action inputs and one or more state inputs, one or more hidden layers, and an output layer for generating a state-action value output, and
the one or more action inputs comprise a destination and a drop-off time associated with performing a vehicle trip,
the one or more state inputs comprise location information of the vehicle and a pick-up time associated with the vehicle trip,
the state-action value comprises a cumulative reward, and
the input layers, the hidden layers, and the output layer are in a sequence and every two neighbor layers are associated with one or more weights.

2. The system of claim 1, wherein:
the neural network model comprises a deep neural network and a reinforcement learning algorithm; and
the deep neural network comprises two deep-Q networks.

3. The system of claim 1, wherein the neural network model is trained by:
modeling the vehicle trips by passing the action inputs and state inputs through the hidden layers to obtain the output, each vehicle trip associated with a first state corresponding to an origin, a second state corresponding to a destination, an action corresponding to fulfilling a ride order from the origin to the destination, and a reward corresponding to fees for the ride; and
updating the weights to maximize the cumulative reward.

4. The system of claim 3, wherein modeling the vehicle trips comprises:
modeling a first vehicle trip to obtain the second state associated with the first vehicle trip; and
searching from a spatio-temporal space to obtain an action to perform at the second state, the spatio-temporal space is within a spatial threshold from the second state.

5. The system of claim 3, wherein modeling the vehicle trips comprises:
modeling a first vehicle trip to obtain the second state associated with the first vehicle trip; and
searching from a spatio-temporal space to obtain an action to perform at the second state, the spatio-temporal space is within a temporal threshold from the second state.

6. The system of claim 1, wherein:
data used for training the neural network model comprises (1) a plurality of the vehicle trips each associated with a measurement period, and (2) one or more terminal states each associated with an end of the measurement period.

7. A computer-implemented method for ride order dispatching, comprising:
obtaining, from a computing device, a current location of a vehicle;
inputting the current location of the vehicle and a time to a trained neural network model to obtain action information for the vehicle, the action information comprising: staying at the current location of the vehicle, re-positioning the vehicle, or accepting a ride order; and
transmitting the action information to the computing device to cause the vehicle to stay at the current location, re-position to another location, or accept the ride order by proceeding to a pick-up location of the ride order,
wherein the neural network model comprises an input layer for receiving one or more action inputs and one or more state inputs, one or more hidden layers, and an output layer for generating a state-action value output, and
the one or more action inputs comprise a destination and a drop-off time associated with performing a vehicle trip,
the one or more state inputs comprise location information of the vehicle and a pick-up time associated with the vehicle trip,
the state-action value comprises a cumulative reward, and
the input layers, the hidden layers, and the output layer are in a sequence and every two neighbor layers are associated with one or more weights.

8. The method of claim 7, wherein:
the neural network model comprises a deep neural network and a reinforcement learning algorithm; and
the deep neural network comprises two deep-Q networks.

9. The method of claim 7, wherein the neural network model is trained by:
modeling the vehicle trips by passing the action inputs and state inputs through the hidden layers to obtain the output, each vehicle trip associated with a first state corresponding to an origin, a second state corresponding to a destination, an action corresponding to fulfilling a ride order from the origin to the destination, and a reward corresponding to fees for the ride; and
updating the weights to maximize the cumulative reward.

10. The method of claim 9, wherein modeling the vehicle trips comprises:
    modeling a first vehicle trip to obtain the second state associated with the first vehicle trip; and
    searching from a spatio-temporal space to obtain an action to perform at the second state, the spatio-temporal space is within a spatial threshold from the second state.

11. The method of claim 9, wherein modeling the vehicle trips comprises:
    modeling a first vehicle trip to obtain the second state associated with the first vehicle trip; and
    searching from a spatio-temporal space to obtain an action to perform at the second state, the spatio-temporal space is within a temporal threshold from the second state.

12. The method of claim 7, wherein:
    data used for training the neural network model comprises (1) a plurality of the vehicle trips each associated with a measurement period, and (2) the data used for training the neural network model comprises one or more terminal states each associated with an end of the measurement period.

13. A non-transitory computer-readable storage medium storing instructions that, when executed by a processor, cause the processor to perform a ride order dispatching method, the method comprising:
    obtaining, from a computing device, a current location of a vehicle;
    inputting the current location of the vehicle and a time to a trained neural network model to obtain action information for the vehicle, the action information comprising: staying at the current location of the vehicle, re-positioning the vehicle, or accepting a ride order; and
    transmitting the action information to the computing device to cause the vehicle to stay at the current location, re-position to another location, or accept the ride order by proceeding to a pick-up location of the ride order,
    wherein the neural network model comprises an input layer for receiving one or more action inputs and one or more state inputs, one or more hidden layers, and an output layer for generating a state-action value output, and
    the one or more action inputs comprise a destination and a drop-off time associated with performing a vehicle trip,
    the one or more state inputs comprise location information of the vehicle and a pick-up time associated with the vehicle trip,
    the state-action value comprises a cumulative reward, and
    the input layers, the hidden layers, and the output layer are in a sequence and every two neighbor layers are associated with one or more weights.

14. The storage medium of claim 13, wherein the neural network model is trained by:
    modeling the vehicle trips by passing the action inputs and state inputs through the hidden layers to obtain the output, each vehicle trip associated with a first state corresponding to an origin, a second state corresponding to a destination, an action corresponding to fulfilling a ride order from the origin to the destination, and a reward corresponding to fees for the ride; and
    updating the weights to maximize the cumulative reward.

* * * * *